March 2, 1965
H. W. STIER
3,171,188
CUTTING TOOL
Filed May 10, 1963
2 Sheets-Sheet 1
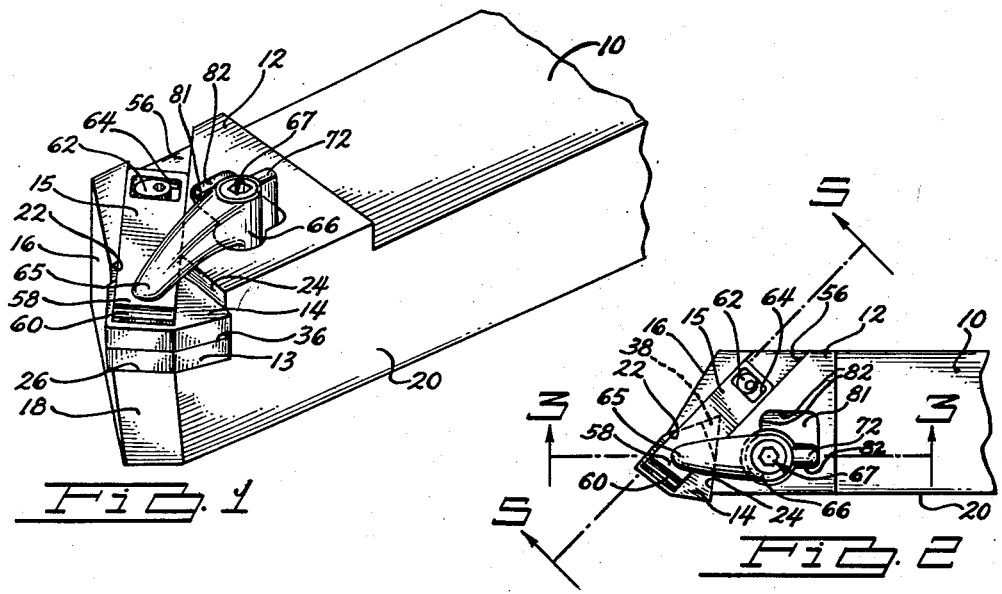
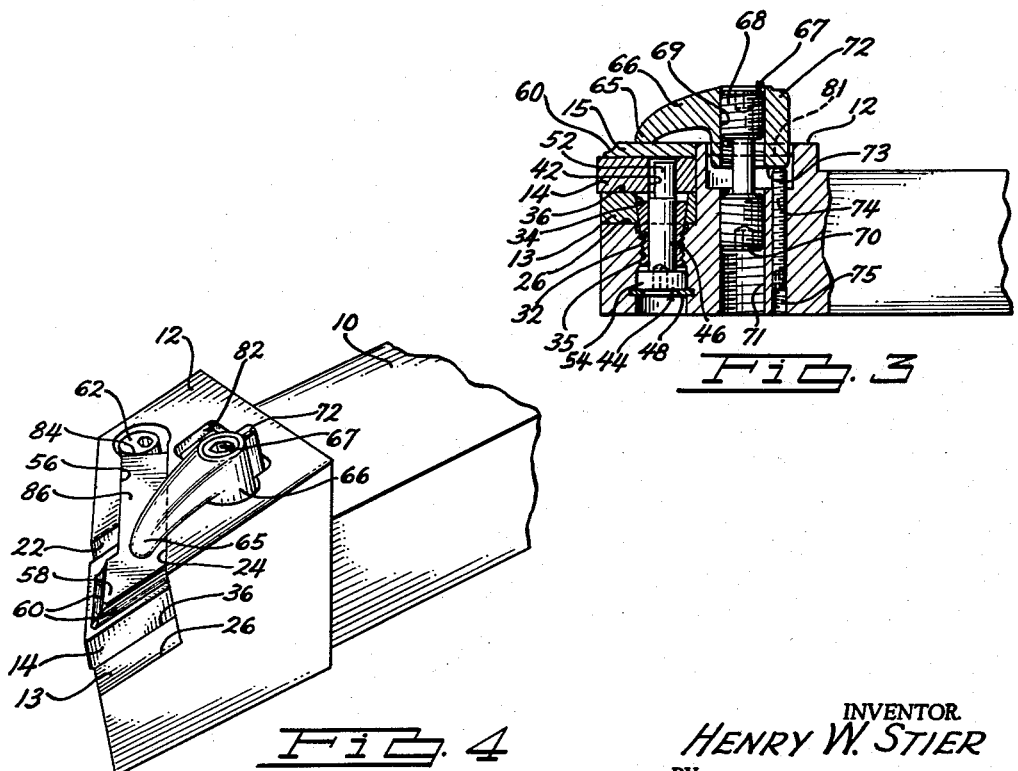
INVENTOR.
HENRY W. STIER
BY
Bower & Patalidis
ATTORNEYS March 2, 1965   H. W. STIER   3,171,188
CUTTING TOOL
Filed May 10, 1963   2 Sheets-Sheet 2
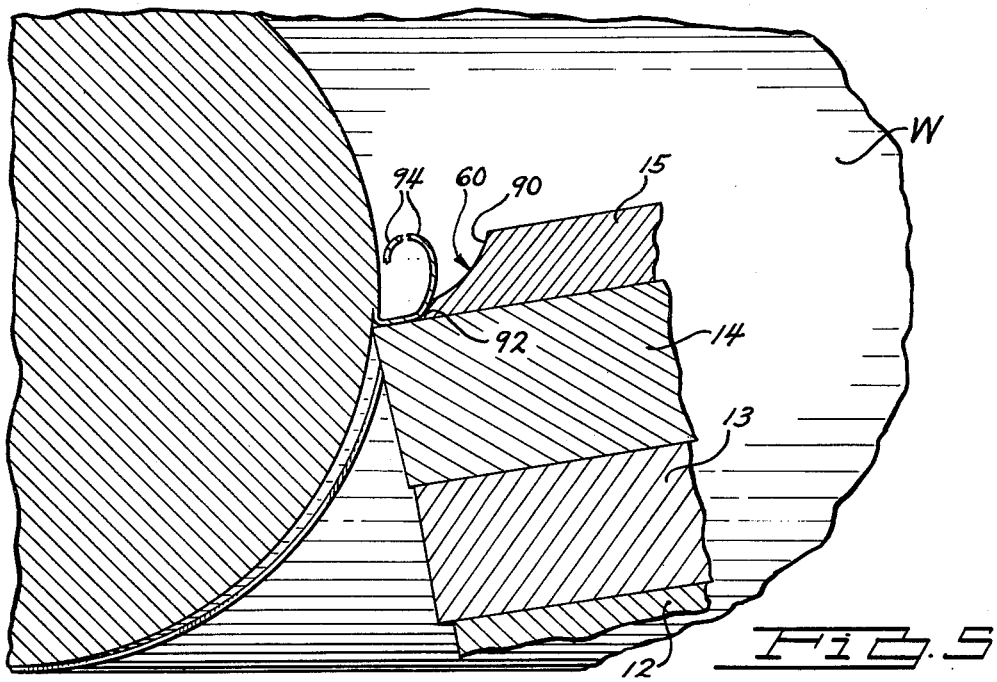
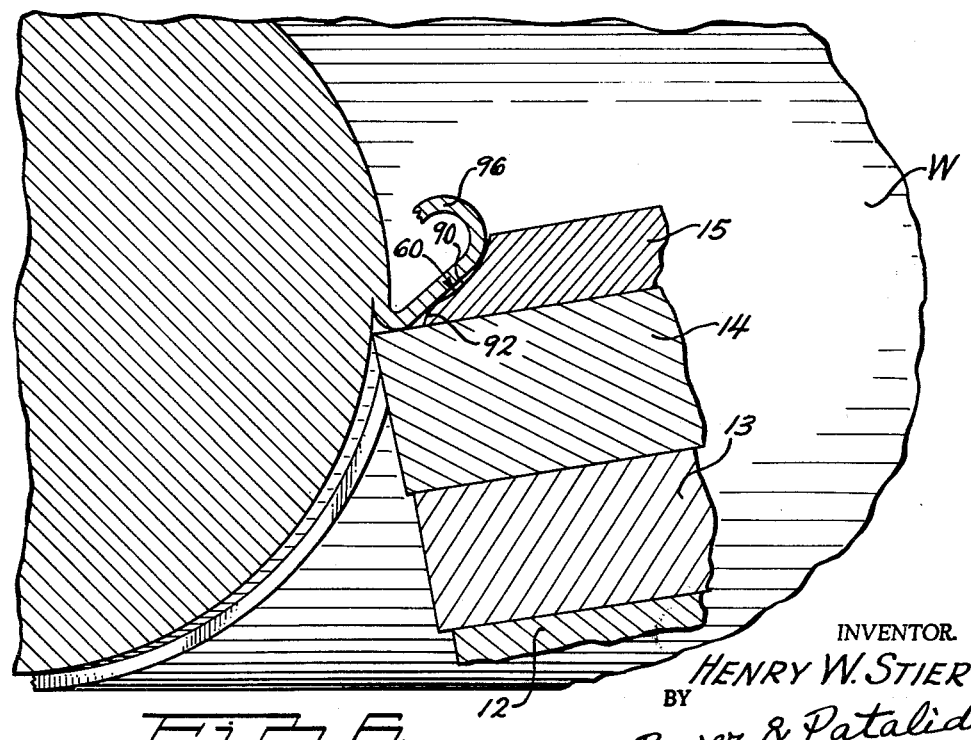
INVENTOR.
HENRY W. STIER
BY
Bower & Patalidis
ATTORNEYS

United States Patent Office 3,171,188
Patented Mar. 2, 1965

3,171,188
CUTTING TOOL
Henry W. Stier, Inkster, Mich., assignor to Willey's
Carbide Tool Company, Detroit, Mich.
Filed May 10, 1963, Ser. No. 279,460
14 Claims. (Cl. 29—96)

This invention relates to improvements in cutting tools and, more particularly, to a type of cutting tool having a readily releasable and replaceable indexable cutting insert made of an ultra-hard material, such as cemented carbides or the like, and an improved releasable and replaceable chip breaker.

When a cutting edge of the cutting insert in the novel cutting tool of the invention becomes worn, the cutting insert is taken out of the tool holder and reinserted in the tool holder with a different cutting edge in operative position, or, when all cutting edges are dulled, it is replaced by a new cutting insert. This allows one cutting insert to be indexed to several usable cutting edges on both its sides before being discarded.

In most metal cutting operations it is desirable to present a cutting edge of the cutting insert to the work at an angle that provides proper clearance and that causes the lines of force in cutting to fall within the confines of the cutting element, thereby strengthening it against the severity of service. In order to eliminate the necessity of clearance and rake angles being ground on the cutting insert itself, the tool holder is provided with an integral insert supporting portion disposed at the preferred angularity so that a cutting insert having parallel faces disposed at right angles to the ends will normally be presented to the work at the desired angle when it is positioned in the tool holder.

The novel cutting tool of the invention can be arranged for right-hand or for left-hand cutting, and is admirably adapted for turning or boring, with a side cutting lead angle. Various tool holder surfac angles, for rake and clearance, may be used in conection with the cutting insert, and various depths of cut may be taken in a workpiece without requiring further adjustment of the chip breaker element of the cutting tool.

The cutting tool of the present invention may be adapted for many turning operations, and includes types generally used on tracer lathes. The latter are high production cam-guided lathes that automatically make a variety of different cuts of varying depth and angularity on each workpiece. The chips formed in such operations often change in size because of the variety of cuts taken on each workpiece and because of the possible variation in hardness between workpieces. It is desirable to maintain the well-known "Figure 9" shaped chips during cutting, and this is accomplished in the present invention by providing a chip breaker which is readily adjustable at any tme during the cutting operation and which is capable of efficiently breaking the chips severed from the workpiece thereby insuring that long stringy chips will not be generated during the machining operation, irrespective of the depth of the cut being taken.

An object of the invention is therefore to provide an inexpensive, but highly efficient, cutting tool, the cutting edge of which is provided on a removable "throw-away" cutting insert, releasably clamped in a recess in the tool holder head, so that the cutting insert can be quickly and easily released for indexing to a new cutting edge, or for replacing when all of the cutting edges are worn.

Another object of the invention is to provide a positive holding means for the cutting insert so that it will stay in position during very heavy service.

A further object of the invention is to provide a chip breaker member that is adjustable both toward and away from the cutting edge, even during a cutting operation, and which effectively breaks the chips, irrespective of the depth of cut, and without further adjustment.

Another object of the invention is to provide a cutting tool holder with adjustment elements easily accessible from both top and bottom.

Still another object of the invention is to provide a clamp for the chip breaker member that will swing out of the way when unclamped, and that will return to the desired position every time for clamping.

Other object and advantages of the invention will become apparent from the following specification taken in connection with the accompanying drawings, wherein like parts are identified by the same reference numerals in the several views. In the drawings:

FIGURE 1 is a perspective view of a cutting tool embodying the principles of the present invention;

FIGURE 2 is a plan view looking down on the cutting tool of FIGURE 1;

FIGURE 3 is a side sectional view of the cutting tool as taken along line 3—3 of FIGURE 2;

FIGURE 4 is a perspective view of an alternate cutting tool also embodying the principles of the present invention;

FIGURE 5 is an enlarged sectional view of the cutting tool of FIGURES 1–3, taken along line 5—5 of FIGURE 2, and showing the tool in the process of taking a thin cut from a workpiece; and FIGURE 6 is a view similar to FIGURE 5, but showing the cutting tool in the process of taking a heavy cut from a workpiece.

Referring now to the example of the invention illustrated in FIGURES 1 to 3, the cutting tool of the invention comprises a shank 10, generally rectangular in cross-section, and elongated so it may be accommodated in the tool post of a conventional cutting machine, such as a metal lathe, and a head 12 which is provided with an angled recess for containing a shim member 13, a cutting insert 14, and a chip breaker member 15. The recess, having a bottom surface 26, is open at the top and two sides and is adjacent to end 16 and adjoining sides 18 and 20 of the head. The interior of the recess is defined by a side wall 22 and a back wall 24, which are in intersecting planes at right angles to the bottom surface 26. On the bottom surface 26, and abutting against walls 22 and 24, is disposed the shim member 13, made of an ultra-hard material and which is in the same general shape as, but slightly smaller than, the cutting insert 14. As shown in FIGURE 3, the shim member 13 is affixed to the bottom surface 26 by means of a hollow lock screw 32 having a tapered head bearing in an annular conical aperture 34 substantially centrally located in the shim member, and a body threading into a threaded bore 35 in the bottom surface.

The cutting insert 14, having a face 36 in contact with the shim member 13, abuts against walls 22 and 24 which have been provided to conform with the desired geometry of the particular cutting insert. A space 38, best shown in FIGURE 2, is provided at the back of the recess as a clearance for any metal chips or dirt that might accumulate and tend to prevent the cutting insert 14 from abutting solidly against walls 22 and 24.

As best seen in FIGURE 3, the cutting insert 14 is provided with a substantially centrally located hole 42 in which a cam lock pin, referred to generally as 44, acts to firmly secure the insert in the recess by eccentric action. The cam lock pin 44 has a cylindrical body 46 which has a friction fit in the hollow shim lock screw 32 and is maintained in its axial position by a snap ring 48 in the unthreaded portion of bore 35. Integral with cylindrical cam lock body 46 is a camming tip 52 which protrudes above the surface of the shim member 13 and which is eccentric to the cylindrical body 46 so that the cutting insert is firmly locked into the tool holder recess by a turn of the cam lock pin by means of a standard Allen wrench introduced into head 54 from underneath the tool holder. When tightened, the camming tip 52 draws the cutting insert into the recess and against the two locating walls 22 and 24, providing accurate seating and positively preventing movement of the cutting insert during a cut.

Above the cutting insert 14, a chip breaker member 15 is disposed slidably in a channel 56 in the tool holder head 12. The chip breaker member is shown in the drawings with a single edge tip 58 that has its breaker edge 60 parallel to the cutting edge of the cutting insert. A chip breaker having two edges, sometimes called a spade type chip breaker, could also be used, depending on the particular cutting operation to which the tool is being applied. The chip breaker member 15 is made adjustable both toward and away from the cutting insert edge by means of an adjustment cam screw 62 acting in an aperture 64 in the chip breaker member. The adjustment cam screw 62 has an eccentric camming head so that any rotation thereof causes positive linear displacement of the chip breaker member in the slot 56. Therefore, the chip breaker member is easily adjustable at any time during a cut by a turn of the adjustment cam screw with an Allen wrench.

Holding the chip breaker member 15 against the cutting insert 14 is a clamping finger 65 that overhangs the recess and is an integral part of a clamp member 66. The clamping finger 65 is tightened against the chip breaker member 15 by way of the differential action of a clamp screw 67 that has an upper threaded portion 68 in screw thread frictional engagement with a threaded bore 69 provided through the clamp member 66, and a lower opposedly threading portion 70 in screw thread engagement with an internally threaded bore 71 provided through the tool holder head normal to the plane of the cutting insert. A clamp flange 72, provided opposite the clamping finger 65, has a bottom face 73 which abuts against the end of a support screw 74 that is adjustably mounted in a recessed threaded bore 75 adjacent and substantially parallel to the threaded bore 71. The support screw 74 provides a balancing point of contact for the clamp member so as to maintain only tension forces in the clamp screw when the latter is tightened. The support screw 74 is turned by an Allen wrench introduced through threaded bore 75 from the bottom of the tool holder in order to adjust the height of the clamp member for variations in thickness of different shim member, cutting insert, and chip breaker member combinations.

When the clamp member 66 is to be loosened, a standard Allen wrench is placed in the socket provided in either end of the clamp screw 67 and turned approximately one full turn to bring the bottom 73 of clamp flange 72 off the support screw 74 and the end of the clamping finger 65 off the top surface of the chip breaker member 15. The final quarter turn of the wrench swings the clamping finger 65 automatically out of the way of the chip breaker member because of the frictional engagement of threaded portion 68 with the threaded bore 69 in the clamp member 66. A pocket 81 is provided in the head with side walls 82 shaped so as to limit the movement of the clamp flange 72, thus allowing the clamping finger to swing approximately 90 degrees and to return to the exact clamping position when the clamp screw 67 is rotated in the opposite direction.

The clamping action imparted by tightening the clamp screw 67 is sufficient to hold the chip breaker member 15 against the cutting insert 14, and also to hold the cutting insert against the shim member 13 should the cam-lock pin 44 fail. However, the frictional forces between these respective members are not so great as to prevent the chip breaker member from being adjusted while it is tightly clamped and a cut is being made.

Another example of the present invention is illustrated in FIGURE 4. FIGURE 4 represents a cutting tool of the same general configuration as described in relation to FIGURES 1 to 3, but which is shown with a diamond shaped indexable cutting insert and a spade type chip breaker member, enabling the tool to take a cut in a workpiece irrespective of the direction of feed of the tool, such as is the case, for example, when the tool is mounted upon the carriage of a tracer lathe. The only other variation in the combination and working of the elements in this example relates to the chip breaker adjusting mechanism which comprises a cam screw 62 acting on an exterior edge 84 of the chip breaker member 86 in order to provide for adjustment of the chip breaker edges 60 toward the cutting edges of the cutting insert 14. Any adjustment of the chip breaker edges away from the cutting edges during a cutting operation is made by turning the cam adjustment screw 62 in an opposite direction and allowing the force of the chips on the chip breaker edges to urge the chip breaker member away from the cutting edge of the cutting insert.

As seen more clearly at an enlarged scale in FIGURES 5 and 6, the chip breaker member 15 of the invention is provided with an edge 60 substantially along the cutting edge of the insert 14. The chip breaking edge 60 presents an upper arcuate concave surface 90 and a lower substantially flat and inclined surface 92 both disposed to be impinged upon by the chips consisting of the stock being removed from, for example, a clockwise rotating workpiece W as would be the case during a normal lathe turning operation.

When a small cut is taken from the workpiece W, as shown in FIGURE 5, a substantially slender chip 94 is sheared from the workpiece by the cutting edge of the cutting insert 14. The chip slides along the top surface of the cutting insert until it impinges upon the lower inclined flat surface 92 of the chip breaker edge 60 which causes the chip to curl and break.

When a heavy cut is taken from the workpiece W, as shown in FIGURE 6, the chip 96 has a tendency to curl away from the top surface of the cutting insert and to form an undesirable continuous coil unaffected by the inclined flat surface 92 of the chip breaker. However, the substantially thick and curling chip 96 is forced to impinge upon the concave upper face 90 of the chip breaker which imposes a bending stress upon the chip and causes it to break in small and harmless bits.

From the above description, it is evident that the invention provdies: (1) a cutting tool having an indexable cutting insert that is securely held by a cam lock pin, assuring positive location and locking of the cutting insert during a cut and providing precisely accurate relocation of the cutting insert when indexed to a fresh cutting edge; (2) an adjustable chip breaker that is prevented from moving or shifting position during a cut, but which may be easily adjusted during a cutting operation, by simply turning an eccentric camming screw; (3) a chip breaker which is effective for light cuts as well as for heavy cuts, without further adjustment; and (4) a chip breaker clamp that does not require loosening for adjustment of the chip breaker, but when loosened for indexing, swings out of the way automatically.

It is to be understood that terms or expressions of direction and orientation, such as "top" and "bottom," used in the above description of the invention refer only to the accompanying drawings as a means for making them more easily understood, and are not meant to limit the use or scope of the invention in any way.

It will also be understood that various changes in the details, materials, steps, and arrangements of elements, which have been herein described and illustrated in order to explain the nature of the invention, may be made by those skilled in the art within the principle and scope of the invention as expressed in the appended claims. It is also evident that some elements may be omitted, such as, for example, the shim member, and that the cutting insert may be disposed directly on the bottom face of the recess, without departing from the spirit and scope of the invention.

What is claimed as new is:

1. A cutting tool comprising in combination: a shank portion adapted to be mounted on the tool post of a machine; an integral head portion having an upper corner removed to form a recess therein, and said head portion being further provided with a flat bottomed channel disposed on the upper surface of said head portion at an angle with the longitudinal axis of said cutting tool; said recess being open at the top and on two sides, and having at least two interior walls and a bottom surface that lies in a single plane normal to said interior walls and substantially parallel to the flat bottom of the channel; a shim member of ultra-hard material provided with parallel upper face and lower face and having said lower face seated on the bottom surface of the recess, said shim member being provided with a centrally located tapered bore to receive a hollow tapered head shim lock screw engaging in a threaded bore in said bottom surface to thereby fasten said shim member securely to said bottom surface; a cutting insert of ultra-hard material provided with parallel upper and lower faces in the form of symmetrical polygons of equal dimensions, each face lying in a single plane and said lower face being seated on the upper face of the shim member with at least two edges of said cutting insert abutting against the interior walls of the recess and opposite edges of said insert projecting slightly from the recess beyond the sides of the head, said cutting insert being provided with a centrally located bore normal to the planes of said upper and lower faces; a cam lock pin having a cylindrical body disposed in the bore of the hollow shim lock screw and retained axially by a snap ring, said cam lock pin having an eccentric camming tip disposed in the centrally located bore of the cutting insert in such a way as to clamp said insert against the interior walls of the recess by the camming action imparted by the rotation of said cam lock pin; a chip breaker member having a flat lower face slidably disposed on the upper face of the cutting insert and in the channel in the head, said chip breaker member being provided with at least one chip breaking edge on one end and an elongated aperture proximate to the other end; an adjustment cam screw threading in a threaded bore in the channel in the head and having an eccentric camming head disposed in the elongated aperture in the chip breaker member in such a way that any rotation of said adjustment cam screw will effect movement of the chip breaking edge toward and away from the cutting edges of the cutting insert; a releasable clamping member mounted on the head alongside the recess, said clamping member having a finger overhanging said recess and engaging the upper face of the chip breaker member and being provided with frictional differential screw means operative from above and below the head to exert a clamping pressure on the chip breaker member, said clamping member being provided with a flange opposite said finger cooperating with abutment means disposed in the head so as to limit the rotation of said clamping member when released and for causing said finger to stop at the desired position over said chip breaker member for clamping; and an adjustable support screw mounted in the head and being adapted to present a support for the flange of the clamping member when the finger thereof is drawn against the chip breaker member.

2. The cutting tool of claim 1 wherein the chip breaker member is provided with an inclined flat portion proximate the upper face of the cutting insert and an arcuate concave portion disposed above said inclined flat portion.

3. A cutting tool comprising in combination: a shank portion adapted to be mounted on the tool post of a machine; an integral head portion having an upper corner removed to form a recess therein, and said head portion being further provided with a flat bottomed channel disposed on the upper surface of said head portion at an angle with the longitudinal axis of said cutting tool; said recess being open at the top and on two sides, and having at least two interior walls and a bottom surface that lies in a single plane normal to said interior walls and substantially parallel to the flat bottom of the channel; a cutting insert of ultra-hard material provided with parallel upper and lower faces in the form of symmetrical polygons of equal dimensions, each face lying in a single plane and said lower face being seated on the bottom surface of the recess with at least two edges of said cutting insert abutting against the interior walls of the recess and opposite edges of said insert projecting slightly from the recess beyond the sides of the head, said cutting insert being provided with a centrally located bore normal to the planes of said upper and lower faces; a cam lock pin having a cylindrical body disposed in a bore in the bottom surface of the recess and registering with the bore in the cutting insert, said cam lock pin being retained axially by a snap ring and being provided with an eccentric camming tip disposed in the centrally located bore of the cutting insert in such a way as to clamp said insert against the interior walls of the recess by the camming action imparted by the rotation of said cam lock pin; a chip breaker member having a flat lower face slidably disposed on the upper face of the cutting insert and in the channel in the head, said chip breaker member being provided with at least one chip breaking edge on one end and an elongated aperture proximate to the other end; an adjustment cam screw threading in a threaded bore in the channel in the head and having an eccentric camming head disposed in the elongated aperture in the chip breaker member in such a way that any rotation of said adjustment cam screw will effect movement of the chip breaking edge toward and away from the cutting edges of the cutting insert; a releasble clamping member mounted on the head alongside the recess, said clamping member having a finger overhanging said recess and engaging the upper face of the chip breaker member and being provided with frictional differential screw means operative from above and below the head to exert a clamping pressure on the chip breaker member, said clamping member being provided with a flange opposite said finger cooperating with abutment means disposed in the head so as to limit the rotation of said clamping member when released and for causing said finger to stop at the desired position over said chip breaker member for clamping; and an adjustable support screw mounted in the head and being adapted to present a support for the flange of the clamping member when the finger thereof is drawn against the chip breaker member.

4. The cutting tool of claim 3 wherein the chip breaker member is provided with an inclined flat portion proximate the upper face of the cutting insert and an arcuate concave portion disposed above said inclined flat portion.

5. A cutting tool comprising in combination: a shank portion adapted to be mounted on the tool post of a machine; an integral head portion having an upper corner removed to form a recess therein, and said head portion being further provided with a flat bottomed channel disposed on the upper surface of said head portion at an angle with the longitudinal axis of said cutting tool; said recess being open at the top and on two sides, and having at least two interior walls and a bottom surface that lies in a single plane normal to said interior walls and substantially parallel to the flat bottom of the channel; a shim member of ultra-hard material provided with parallel upper face and lower face and having said lower face seated on the bottom surface of the recess, said shim member being provided with a centrally located tapered bore to receive a hollow tapered head shim lock screw engaging in a threaded bore in said bottom surface to thereby fasten said shim member securely to said bottom surface; a cutting insert of ultra-hard material provided with parallel upper and lower faces in the form of symmetrical polygons of equal dimensions, each face lying in a single plane and said lower face being seated on the upper face of the shim member with at least two edges of said cutting insert abutting against the interior walls of the recess and opposite edges of said insert projecting slightly from the recess beyond the sides of the head, said cutting insert being provided with a centrally located bore normal to the planes of said upper and lower faces; a cam lock pin having a cylindrical body disposed in the bore of the hollow shim lock screw and retained axially by a snap ring, said cam lock pin having an eccentric camming tip disposed in the centrally located bore of the cutting insert in such a way as to clamp said insert against the interior walls of the recess by the camming action imparted by the rotation of said cam lock pin; a chip breaker member having a flat lower face slidably disposed on the upper face of the cutting insert and in the channel in the head, said chip breaker member being provided with at least one chip breaking edge on one end; an adjustment cam screw threading in a threaded bore in the channel in the head and having an eccentric camming head adapted to contact the other end of the chip breaker member in such a way that any rotation of said adjustment cam screw will effect movement of said chip breaking edge toward the cutting edges of the cutting insert; a releasable clamping member mounted on the head alongside the recess, said clamping member having a finger overhanging said recess and engaging the upper face of the chip breaker member and being provided with frictional differential screw means operative from above and below the head to exert a clamping pressure on the chip breaker member, said clamping member being provided with a flange opposite said finger cooperating with abutment means disposed in the head so as to limit the rotation of said clamping member when released and for causing said finger to stop at the desired position over said chip breaker member for clamping; and an adjustable support screw mounted in the head and being adapted to present a support for the flange of the clamping member when the finger thereof is drawn against the chip breaker member.

6. The cutting tool of claim 5 wherein the chip breaker member is provided with an inclined flat portion proximate the upper face of the cutting insert and an arcuate concave portion disposed above said inclined flat portion.

7. A cutting tool comprising in combination: a shank portion adapted to be mounted on the tool post of a machine; an integral head potrion having an upper corner removed to form a recess therein, and said head portion being further provided with a flat bottomed channel disposed on the upper surface of said head portion at an angle with the longitudinal axis of said cutting tool; said recess being open at the top and on two sides, and having at least two interior walls and a bottom surface that lies in a single plane normal to said interior walls and substantially parallel to the flat bottom of the channel; a cutting insert of ultra-hard material provided with parallel upper and lower faces in the form of symmetrical polygons of equal dimensions, each face lying in a single plane and said lower face being seated on the bottom surface of the recess with at least two edges of said cutting insert abutting against the interior walls of the recess and opposite edges of said insert projecting slightly from the recess beyond the sides of the head, said cutting insert being provided with a centrally located bore normal to the planes of said upper and lower faces; a cam lock pin having a cylindrical body disposed in a bore in the bottom surface of the recess and registering with the bore in the cutting insert, said cam lock pin being retained axially by a snap ring and being provided with an eccentric camming tip disposed in the centrally located bore of the cutting insert in such a way as to clamp said insert against the interior walls of the recess by the camming action imparted by the rotation of said cam lock pin; a chip breaker member having a flat lower face slidably disposed on the upper face of the cutting insert and in the channel in the head, said chip breaker member being provided with at least one chip breaking edge on one end; an adjustment cam screw threading in a threaded bore in the channel in the head and having an eccentric camming head adapted to contact the other end of the chip breaker member in such a way that any rotation of said adjustment cam screw will effect movement of said chip breaking edge toward the cutting edges of the cutting insert; a releasable clamping member mounted on the head alongside the recess, said clamping member having a finger overhanging said recess and engaging the upper face of the chip breaker member and being provided with frictional differential screw means operative from above and below the head to exert a clamping pressure on the chip breaker member, said clamping member being provided with a flange opposite said finger cooperating with abutment means disposed in the head so as to limit the rotation of said clamping member when released and for causing said finger to stop at the desired position over said chip breaker member for clamping, and an adjustable support screw mounted in the head and being adapted to present a support for the flange of the clamping member when the finger thereof is drawn against the chip breaker member.

8. The cutting tool of claim 7 wherein the chip breaker member is provided with an inclined flat portion proximate the upper face of the cutting insert and an arcuate concave portion disposed above said inclined flat portion.

9. A cutting tool comprising in combination: a shank portion provided with an integral head portion; a channel in the head portion disposed at an angle with the longitudinal axis of said cutting tool; a cut-away recess disposed in a corner of the head portion and having a bottom surface and at least two interior walls substantially normal to said bottom surface; a shim member having parallel upper and lower surfaces, said shim member being affixed to the bottom surface of the recess; a cutting insert seated on the upper face of the shim member and having at least two edges abutting against the interior walls of the recess and at least one cutting edge protruding beyond the recess; cam lock means clamping the cutting insert with said two edges abutting against said interior walls; a chip breaker member slidably disposed in the channel with at least one chip breaking edge at one end thereof proximate the cutting edge of the cutting insert; an adjustable clamping member for pressing the chip breaker member against the cutting insert; eccentric adjusting means adapted to linearly displace the chip breaker member to cause its chip breaking edge to be adjustably movable in relation to the cutting edge of the insert; and means adapted to cooperate with the adjustable clamping member to cause said member to swing to a first predetermined position when loosened and to swing back in an opposite direction to a second predetermined position when tightened.

10. The cutting tool of claim 9 wherein the chip breaking edge of the chip breaker member comprises a lower inclined flat portion and an upper arcuate concave portion.

11. A cutting tool comprising in combination: a shank portion provided with an integral head portion; a channel in the head portion disposed at an angle with the longitudinal axis of said cutting tool; a cut-away recess disposed in a corner of the head portion and having a bottom surface and at least two interior walls substantially normal to said bottom surface; a cutting insert seated on the bottom surface of the recess and having a least two edges abutting against the interior walls of said recess and at least one cutting edge protruding beyond said recess; cam lock means clamping the cutting insert with said two edges abutting against said interior walls; a chip breaker member slidably disposed in the channel with at least one chip breaking edge at one end thereof proximate the cutting edge of the cutting insert; an adjustable clamping member for pressing the chip breaker member against the cutting insert; eccentric adjusting means adapted to linearly displace the chip breaker member to cause its chip breaking edge to be adjustably movable in relation to the cutting edge of the insert; and means adapted to cooperate with the adjustable clamping member to cause said member to swing to a first predetermined position when loosened and to swing back in an opposite direction to a second predetermined position when tightened.

12. The cutting tool of claim 11 wherein the chip breaking edge of the chip breaker member comprises a lower inclined flat portion and an upper arcuate concave portion.

13. A removable and adjustable chip breaker adapted for clamping above a cutting insert disposed in a pocket in a tool holder, said chip breaker comprising at least one chip breaking edge disposed generally parallelly to the cutting edge of said cutting insert and said chip breaking edge being further provided with an inclined flat portion and an arcuate concave portion disposed above said inclined flat portion.

14. A chip breaker for a cutting tool having at least one cutting edge, said chip breaker comprising at least one chip breaking edge provided with an inclined flat portion and an arcuate concave portion disposed one above the other.

References Cited by the Examiner
UNITED STATES PATENTS

| | | | |
|---|---|---|---|
| Re. 25,461 | 10/63 | Almen | 29—96 |
| 2,848,789 | 8/58 | Friedline | 29—96 |
| 2,848,790 | 8/58 | McMann | 29—95 XR |
| 2,860,402 | 11/58 | Proksa | 29—96 |
| 2,967,345 | 1/61 | Novkov | 29—96 |
| 3,059,316 | 10/62 | Bader | 29—96 |
| 3,084,416 | 4/63 | Broughton | 29—96 |

FOREIGN PATENTS

| | | |
|---|---|---|
| 831,244 | 3/60 | Great Britain. |
| 868,012 | 5/61 | Great Britain. |
| 674,112 | 4/39 | Germany. |
| 1,085,746 | 7/60 | Germany. |

WILLIAM W. DYER, Jr., *Primary Examiner.*